Feb. 6, 1962  J. M. WALKER, JR  3,019,502
LOCKING DEVICE FOR OIL WELL DRILL RODS OR PIPES
Filed July 23, 1958
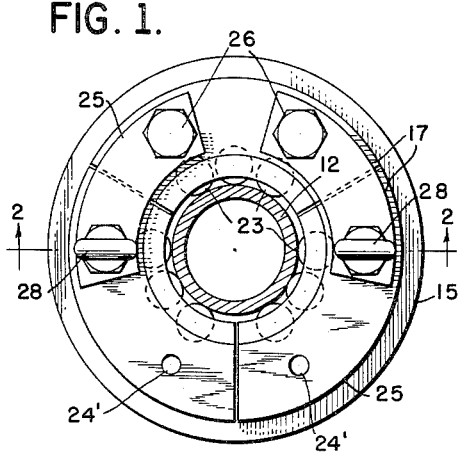
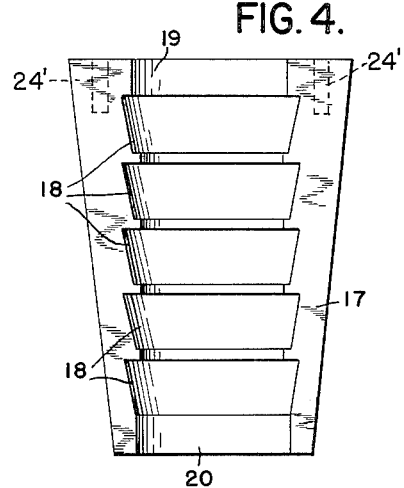
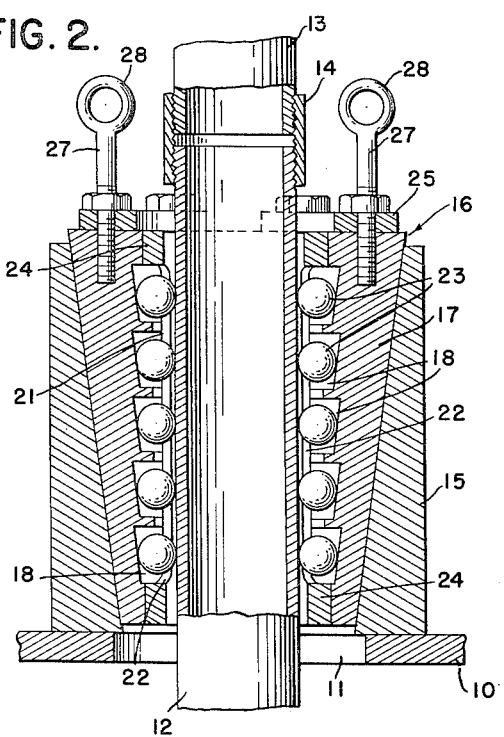
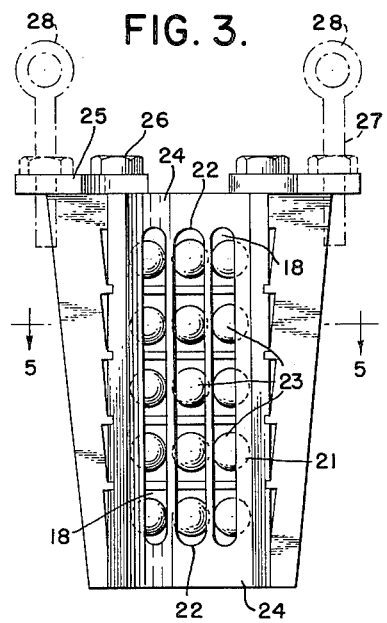
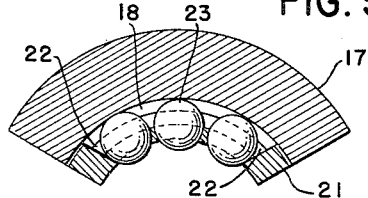
INVENTOR.
JOHN M. WALKER JR.
BY
*Harvey + Harvey*
ATTORNEYS

United States Patent Office 3,019,502
Patented Feb. 6, 1962

3,019,502
LOCKING DEVICE FOR OIL WELL DRILL RODS OR PIPES
John M. Walker, Jr., P.O. Box 147, Houma, La., assignor of one-fourth to Henry J. Frost, Thibodaux, one-fourth to Jack L. Murphy, Houma, and one-fourth to Edmond L. Deramee, Jr., Thibodaux, La.
Filed July 23, 1958, Ser. No. 750,518
6 Claims. (Cl. 24—263)

This invention is primarily intended as a locking device for holding pipes or rods in oil wells, but is susceptible of many other uses obvious to those skilled in the art.

Many attempts have been made to provide a locking device for oil well drill rods and pipes and some of these have met with success, where the load to be sustained is relatively light. However, I have found from actual experiment, no known locking device is efficient and positive in its operation, where the load stress exceeds one hundred thousand pounds, as found in deep oil well work. These experiments have included locking devices with a single circular series of balls, as shown in the patent to Orwig, No. 1,620,913 patented March 15, 1927; multiple series of rollers of variable diameters as shown in the patent to Miether, No. 2,283,082 patented May 12, 1942; and the combination of toothed segments and a plurality of series of rollers of different diameters as shown in the patent to Carroll, No. 1,852,695 patented April 5, 1932. With the single row of balls, the pipe collapsed under relatively heavy load. With the multiple rollers of variable diameters, the smaller rollers crushed under heavy load. With the combination of the toothed segments and different diameter rollers, the teeth mutilated the pipe and the smaller rollers were crushed under heavy stress.

Objects of this invention therefore, are to provide a locking device especially adapted for use on oil well pipes in the exceedingly high weight range, which will positively lock the pipe at the option of the user without damage to the pipe or injury to the workmen; to provide a locking device of this type which is relatively simple in construction, foolproof in operation and eliminates practically all hazard to the oil well workmen; to provide a device of this character which equally distributes the pressure completely around an appreciable length of the pipe without biting into or otherwise mutilating the pipe; and to provide a device which is especially adapted for use in locking oil pipes in deep oil wells, yet may be adapted to grip, pull, or turn various sizes and shapes of metal pipes, rods and the like.

Other objects of the invention will be manifest from the following description of the present preferred form of the invention, taken in connection with the accompanying drawings, wherein:

FIG. 1 is a top plan view of a locking device constructed in accordance with the present invention, illustrating its application;

FIG. 2 is a vertical sectional view of the same, taken on the line 2—2 of FIG. 1, looking in the direction of the arrows;

FIG. 3 is an inside elevational view of a complete cage segment;

FIG. 4 is an inside elevational view of one of the outer segments of the cage; and FIG. 5 is a horizontal sectional view taken on the line 5—5 of FIG. 3 looking in the direction of the arrows, showing a complete cage segment.

In order to illustrate the application of this invention, there is shown in the drawing, a conventional supporting platform 10, with an opening 11 which communicates with the oil well opening. A pipe 12 is shown supported by the locking device of this invention, the lower end of the pipe extending into the oil well through the opening 11 of the platform. For a purpose to be hereinafter described, an upper pipe section 13 is secured to the pipe 12 by a coupling 14.

The device of this invention includes a frusto-conical housing 15 in which is mounted a cage generally designated 16. The cage includes outer and inner shells with ball bearings strategically positioned therein. The outer shell is composed of a plurality of segments 17 which, when assembled, form a frusto-conical body complementing the internal contour of the housing 15 and adapted for wedge fit in the latter, as shown to advantage in FIG. 2. Each of the outer shell segments is provided with a plurality of annular ball races 18, the wall of each of which is canted, as shown to advantage in FIGS. 2 and 4. The upper and lower terminal of each segment 17 ends in an arcuate recess 19 and 20 respectively, so that when the segments of the outer shell are assembled, a circular opening is provided at each end of the shell. The inner shell is composed of a plurality of segments 21. Each of the segments 21 is provided with a plurality of elongated openings 22 which span the extent of the ball races 18 through which openings ball bearings 23, mounted in the ball races 18, protrude, as advantageously illustrated in FIGS. 1, 2, 3 and 5. When the inner segments 21 are assembled, the opposite ends, formed to provide collars 24, fit into and are fixedly secured, in any suitable manner, to the wall of the opening, at each end of the outer shell, when the segments 17 of the latter are engaged. Upon reference to FIG. 2 of the drawings, it will be noted that the ball bearings 23 have freedom to move bodily in a vertical plane between the confines of the top and bottom of each of the races 18.

The outer shell segments are interchangeable and the top of each is provided with a pair of tapped recesses 24′ located substantially as shown in FIG. 1. One of the segments is connected to the remaining two segments by a pair of links 25 and bolts 26, the threaded shanks of which latter are passed through openings in the links and screwed into the recesses 24′. At diametrically opposite points, the shanks of two bolts are extended, as indicated at 27, and their upper terminals formed to provide hoisting eyes 28. The hoisting eyes are employed for raising the cage 16 manually or by mechanical means when the well pipe or rod is being manipulated in the cage.

In use of this device, the housing 15 is superimposed on the platform 10 or other support approximately as shown in FIG. 2 of the drawing. The pipe 12 is lowered through the housing and through the opening 11 of the platform. The segmental cage assembly is wrapped around the pipe 12, above the housing and the assembly allowed to drop into the housing 15 where the complemental faces of the housing and the cage assembly will be in contiguity and the ball bearings 23 in surface engagement with the pipe 12, as also shown in FIGS. 1 and 2. It will be observed from FIGS. 1 and 2 that the ball bearings, which are of uniform diameter, will be engaged in clusters along an appreciable length of the pipe and around an appreciable portion of its circumference, which results in equal distribution of forces along the pipe for effective and efficient operation with pipes in the high weight range. By this construction, when the wedging forces balances the weight of the pipe, no lowering of the pipe or rod can take place. Additional pipe sections, indicated at 13 in FIG. 2 may be added. Slight upward thrust applied to pipe section 13 will release the wedging forces and the cage assembly may be removed by exerting upward pressure on the hoisting eyes 28. A similar procedure is followed when removing, instead of adding, lengths of pipe.

While I have herein shown and described a preferred embodiment of my invention, it is nevertheless to be understood that various changes may be made therein, without departing from the spirit and scope of the claims hereto appended.

What I claim is:

1. A locking device for holding pipes or rods in wells including a housing anchored on a support at the locus of the well opening, and a cage mounted in the housing in concentric relation to the pipe or rod to be supported, the cage comprising inner and outer shells, the inner shell being provided with elongated openings, there being annular recesses formed in the outer shell, the wall of each of which is canted, and sets of ball bearings mounted at intervals in the annular recesses, the bearings being of uniform size and protruding through the elongated openings of the inner shell for surface contact with the well pipe or rod, each bearing of each set being bodily movable inwardly along the canted wall of each annular recess to exert a locking force on the pipe or rod passed through the cage.

2. The locking device of claim 1 wherein the openings of the inner shell are so arranged that the ball bearings are maintained in vertical alignment in groups around the outer surface of the well pipe.

3. The locking device of claim 2 wherein the inner and outer shells of the cage are made of a plurality of complemental segments interfitted and secured together.

4. A locking device for holding pipes or rods in wells, including a housing anchored on a support at the locus of the well opening and a cage comprising an inner and outer shell mounted in the housing in concentric relation to the pipe or rod to be supported, the outer shell having a plurality of annular ball races, the ball-engaging walls of which are canted, ball bearings mounted in each of said annular races, the inner shell of said cage being in contiguous relationship with the outer shell to retain the ball bearings in the annular races and including a plurality of elongated vertical openings coextensive with said annular races through which a portion of each ball bearing protrudes for surface contact with the well pipe or rod, said ball bearings being movable vertically on the canted wall surfaces within the confines of their respective annular races.

5. The locking device of claim 4 wherein said canted body engaging wall surfaces of the annular races taper inwardly from top to bottom to effect a wedging force on the pipe or rod when the cage and pipe or rod are mounted in the housing.

6. A locking device for holding pipes or rods in wells including a frusto-conical housing anchored on a support at the locus of the well opening, and a cage assembly adapted for reception within said housing, said cage assembly including an outer shell of frusto-conical shape to complement the contour of the inner wall of the housing, the outer shell comprising a plurality of segments, each of said segments having vertically spaced annular ball races, the wall of each of which is canted inwardly from top to bottom, links connecting said segments together, the cage assembly further including an inner shell comprising a plurality of segments fixed to the inner faces of the outer shell segments, each of which inner shell segments is provided with a plurality of elongated vertical openings each of which span the vertical extent of the ball races, and ball bearings positioned in the ball races at intervals in engagement with said canted wall surfaces around a substantial portion of the pipe's circumference and through a substantial portion of its length, the ball bearings being confined in the annular races by said inner shell and protruding through the elongated openings thereof a predetermined and limited amount for engagement with the pipe or rod passed through the cage assembly, said ball bearings being bodily movable downwardly on the canted wall surfaces of the annular ball races to exert a wedging force on the pipe or rod.

References Cited in the file of this patent

UNITED STATES PATENTS

| | | |
|---|---|---|
| Re. 19,910 | Parker | Mar. 31, 1936 |
| 225,517 | Gilman | Mar. 16, 1880 |
| 1,031,637 | Fischer | July 2, 1912 |
| 1,079,396 | Chapman | Nov. 25, 1913 |
| 1,196,033 | Schmuck | Aug. 29, 1916 |
| 1,343,426 | Wright | June 15, 1920 |
| 1,370,140 | McDowell | Mar. 1, 1921 |
| 1,738,101 | Graham | Dec. 3, 1929 |
| 1,753,543 | Wilson et al. | Apr. 8, 1930 |
| 1,933,935 | Santiago | Nov. 7, 1933 |
| 2,058,689 | Hauser | Oct. 27, 1936 |
| 2,179,006 | Bronzan et al. | Nov. 7, 1939 |
| 2,221,376 | Fortune et al. | Nov. 12, 1940 |
| 2,303,312 | Sheffield | Nov. 24, 1942 |
| 2,736,941 | Mullinix | Mar. 6, 1956 |
| 2,781,658 | Dobell | Feb. 19, 1957 |